(12) United States Patent
Phillips et al.

(10) Patent No.: US 8,745,202 B2
(45) Date of Patent: Jun. 3, 2014

(54) TRACKING REMOTE BROWSER CRASHES VIA COOKIES

(75) Inventors: Derek J. Phillips, Waterloo (CA); Robert J. Kroeger, Waterloo (CA)

(73) Assignee: Google Inc., Mountain View, CA (US)

( * ) Notice: Subject to any disclaimer, the term of this patent is extended or adjusted under 35 U.S.C. 154(b) by 622 days.

(21) Appl. No.: 12/418,470

(22) Filed: Apr. 3, 2009

(65) Prior Publication Data

US 2010/0257255 A1 Oct. 7, 2010

(51) Int. Cl.
*G06F 15/173* (2006.01)

(52) U.S. Cl.
USPC ........................................................ 709/224

(58) Field of Classification Search
USPC ........................................................ 709/224
See application file for complete search history.

(56) References Cited

U.S. PATENT DOCUMENTS

| | | | |
|---|---|---|---|
| 6,964,008 B1 | 11/2005 | Van Meter, III | 714/807 |
| 7,788,540 B2 * | 8/2010 | Merriman et al. | 714/38 |
| 7,900,005 B2 | 3/2011 | Kotsovinos et al. | 711/162 |
| 2003/0061275 A1 * | 3/2003 | Brown et al. | 709/203 |
| 2003/0074526 A1 | 4/2003 | Kanamaru et al. | 711/113 |
| 2003/0187957 A1 | 10/2003 | Huang et al. | 709/219 |
| 2004/0049693 A1 | 3/2004 | Douglas | 713/200 |
| 2004/0163083 A1 | 8/2004 | Wang et al. | 718/102 |
| 2005/0021744 A1 * | 1/2005 | Haitsuka et al. | 709/224 |
| 2007/0271309 A1 | 11/2007 | Witriol et al. | 707/201 |
| 2008/0037721 A1 | 2/2008 | Yao et al. | 379/88.11 |
| 2009/0100438 A1 * | 4/2009 | Hinton et al. | 719/311 |
| 2010/0031153 A1 * | 2/2010 | Ortwein et al. | 715/733 |
| 2010/0228737 A1 | 9/2010 | Riemers | 707/747 |

* cited by examiner

*Primary Examiner* — Maceeh Anwari
(74) *Attorney, Agent, or Firm* — Shumaker & Sieffert, P.A.

(57) ABSTRACT

The methods track abnormal events on mobile client devices, such as web application crashes, and use that information to associate the abnormal events with device characteristics. A first method executes on mobile client devices. When a web application starts, the method looks for a crash indicator cookie in persistent memory. If the cookie does not exist, the method creates and stores it. If the cookie already exists, the method collects information about the client device, such as device type, browser type, and operating system, and sends the information to a web server. The web application deletes the cookie when the application terminates normally. A second method executes on a web server. This method receives information from client devices relating to abnormal events for web applications. The information includes device characteristics of each client device. This method stores the information and associates a pattern of abnormal events with device characteristics.

18 Claims, 6 Drawing Sheets

TRACKING REMOTE BROWSER CRASHES VIA COOKIES

RELATED APPLICATIONS

This application relates to U.S. patent application Ser. No. 12/418,444, "System and Method for Reducing Startup Cost of a Software Application," filed on Apr. 3, 2009, which is hereby incorporated by reference in its entirety.

This application relates to U.S. patent application Ser. No. 12/418,460, "Reduced Bandwidth Cache Coherency via Checksum Exchange," filed on Apr. 3, 2009, which is hereby incorporated by reference in its entirety.

This application relates to U.S. patent application Ser. No. 12/418,483, "Architectural Pattern for Persistent Web Application Design," filed on Apr. 3, 2009, which is hereby incorporated by reference in its entirety.

TECHNICAL FIELD

The disclosed embodiments relate generally to the field of mobile client devices, and in particular, to web applications running in browsers on mobile client devices.

BACKGROUND

Desktop computers have been running application programs for decades. With the introduction of the Internet, web browsers were developed to view web pages. Initially, the task of a browser was just to render static web pages in a visual form. Over time browsers have expanded their capabilities to include dynamic web pages and web applications. Web applications run in a browser, and execute code such as code written in the JAVASCRIPT scripting language.

At the same time that browsers have expanded their functionality, the hardware platforms that can run browsers have also expanded. Currently, users can run web applications in browsers on small mobile devices, such as the IPHONE mobile phone or devices running the Android operating system.

However, web applications running in browsers on mobile client devices are more prone to crash than web applications running on desktop computers, creating a less satisfactory user experience. There are many different browsers and operating systems running on many different mobile devices, and they have not undergone the same extensive user testing of browsers and operating systems that has occurred for desktop computers.

Developers of web applications for mobile devices must therefore address the application crashes and other abnormal events, and have the added difficulty of determining whether the bad events were due to the web application, the browser, the operating system, the physical device, or a combination of these.

Accordingly, there is a need for a method to track abnormal events that occur in web applications on mobile client devices, including sufficient information so that the abnormal events can be associated with identifiable characteristics of the mobile devices.

SUMMARY

The above problems associated with abnormal events on mobile client devices are addressed by the disclosed methods and systems. In some embodiments, the methods and systems operate on a notebook computer or handheld device. In some embodiments, the methods and systems operate on a mobile device with a touchpad. In some embodiments, the methods and systems operate on a device with a touch screen. In some embodiments, the methods and systems operate on a device with a graphical user interface (GUI), one or more processors, memory and one or more modules, programs or sets of instructions stored in the memory for performing multiple functions. In some embodiments the executable instructions for performing these functions may be included in a computer readable storage medium or other computer program product configured for execution by one or more processors.

In accordance with some embodiments, a computer-implemented method is performed at a mobile client device with a persistent memory. The mobile client device has a web browser configured to execute on the mobile client device. The method initiates startup of a client web application within a browser on the mobile client device, which includes determining whether a crash indicator cookie for the client web application exists in persistent memory. If the crash indicator cookie does not exist in the persistent memory, then the method creates the crash indicator cookie and stores the crash indicator cookie in persistent memory. If the crash indicator cookie does exist in the persistent memory, then the method collects information about the mobile client device and the browser, and sends the information to a remote web server. In some embodiments, the information is sent in a message that includes the context surrounding the occurrence of an abnormal termination event. The method subsequently deletes the crash indicator cookie when the client web application terminates normally.

In accordance with some embodiments, a computer-implemented method is performed at a mobile client device with a persistent memory. The mobile client device has a web browser configured to execute on the mobile client device. The method initiates startup of a client web application within a browser on the mobile client device, and the startup includes determining whether a crash indicator cookie for the client web application exists in persistent memory. If the crash indicator cookie does not exist in persistent memory, the method creates the crash indicator cookie, and stores the crash indicator cookie in persistent memory. The crash indicator cookie includes a status indicator that is initially set to a first status value. If the crash indicator cookie does exist in the persistent memory and the status indicator of the crash indicator cookie is set to the first status value, the method collects information about the mobile client device and the browser, and sends the information to a remote web server. The information is in a message that includes the context surrounding the occurrence of an abnormal event. If the crash indicator cookie does exist in persistent memory and the status indicator of the crash indicator cookie is set to a second status value, the method updates the value of the status indicator in the crash indicator cookie to the first status value. The method subsequently updates the value of the status indicator in the crash indicator cookie to a second status value when the client web application terminates normally. The second status value is distinct from the first status value.

In accordance with some embodiments, a computer-implemented method is performed at a web server. The web server receives information from a mobile client device relating to an abnormal event for a web application executing on the mobile client device. The information includes a plurality of device characteristics of the mobile client device, including device type and browser type. The web server stores the information in an event log and associates the abnormal event with one or more device characteristics stored in the event log.

In accordance with some embodiments, a computer-implemented method is performed at a web server. The web server receives information from a plurality of mobile client devices relating to abnormal events for a web application executing on the mobile client devices. The information includes a plurality of device characteristics of each mobile client device, including device type and browser type. The web server stores the information in an event log. The web server further identifies a pattern of abnormal events based on the information in the event log and associates the pattern abnormal events with one or more device characteristics stored in the event log.

In accordance with some embodiments, a mobile client device includes a display, one or more processors, memory (both volatile memory and persistent memory), and one or more programs stored in the memory and configured to be executed by the one or more processors. The one or more programs include a browser application and a client web application. The one or more programs include instructions for initiating startup of the client web application within the browser program on the mobile client device. During startup the one or more programs determine whether a crash indicator cookie exists in persistent memory. If the crash indicator cookie does not exist in the persistent memory, the one or more programs create the crash indicator cookie, and store the cookie in the persistent memory. If the crash indicator cookie does exist in the persistent memory, the one or more programs collect information about the mobile client device and the browser application, and send the information to a remote web server. The information is in a message that includes the context surrounding the occurrence of an abnormal event. Subsequently, when the client web application terminates normally, the one or more programs delete the crash indicator cookie from persistent memory.

In accordance with some embodiments, a mobile client device includes a display, one or more processors, memory (both volatile memory and persistent memory), and one or more programs stored in the memory and configured to be executed by the one or more processors. The programs include a browser application and a client web application. The one or more programs include instructions for initiating startup of the client web application within the browser program on the mobile client device. During startup the one or more programs determine whether a crash indicator cookie exists in persistent memory. If the crash indicator cookie does not exist in persistent memory, the one or more programs create the crash indicator cookie and store the crash indicator cookie in persistent memory. The crash indicator cookie includes a status indicator set to a first status value. If the crash indicator cookie does exist in persistent memory and the status indicator of the crash indicator cookie is set to the first status value the one or more programs collect information about the mobile client device and the browser application, and send the information to a remote web server. The information is in a message that includes the context surrounding the occurrence of an abnormal event. If the crash indicator cookie does exist in persistent memory and the status indicator of the crash indicator cookie is set to a second status value, the one or more programs update the value of the status indicator in the crash indicator cookie to the first status value. Subsequently, when the client web application terminates normally, the one or more programs update the value of the status indicator in the crash indicator cookie to the second status value. The second status value is distinct from the first status value.

In accordance with some embodiments, a web server system includes a one or more processors, memory, and one or more programs stored in the memory and configured to be executed by the one or more processors. The one or more programs include instructions for receiving information from a mobile client device relating to an abnormal event for a web application executing on the mobile client device. The information includes a plurality of device characteristics of the mobile client device, including device type and browser type. The one or more programs further include instructions for storing the information in an event log and associating the abnormal event with one or more device characteristics stored in the event log.

In accordance with some embodiments, a web server system includes a one or more processors, memory, and one or more programs stored in the memory and configured to be executed by the one or more processors. The one or more programs include instructions for receiving information from a plurality of mobile client devices relating to abnormal events for a web application executing on the mobile client devices. The information includes a plurality of device characteristics of each mobile client device, including device type and browser type. The one or more programs further include instructions for storing the information in an event log. The one or more programs also include instructions for identifying a pattern of abnormal events based on the information in the event log and associating the pattern of abnormal events with one or more device characteristics stored in the event log.

Thus, methods and systems are provided that track abnormal web application events, and associate patterns of abnormal events with device characteristics. This enables application and device developers to effectively address the abnormal events, and reduce the number of abnormal events in the future. This increases user satisfaction with mobile client devices and the web applications that run on those devices. The methods and systems may complement or replace other methods for detecting and addressing abnormal events.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
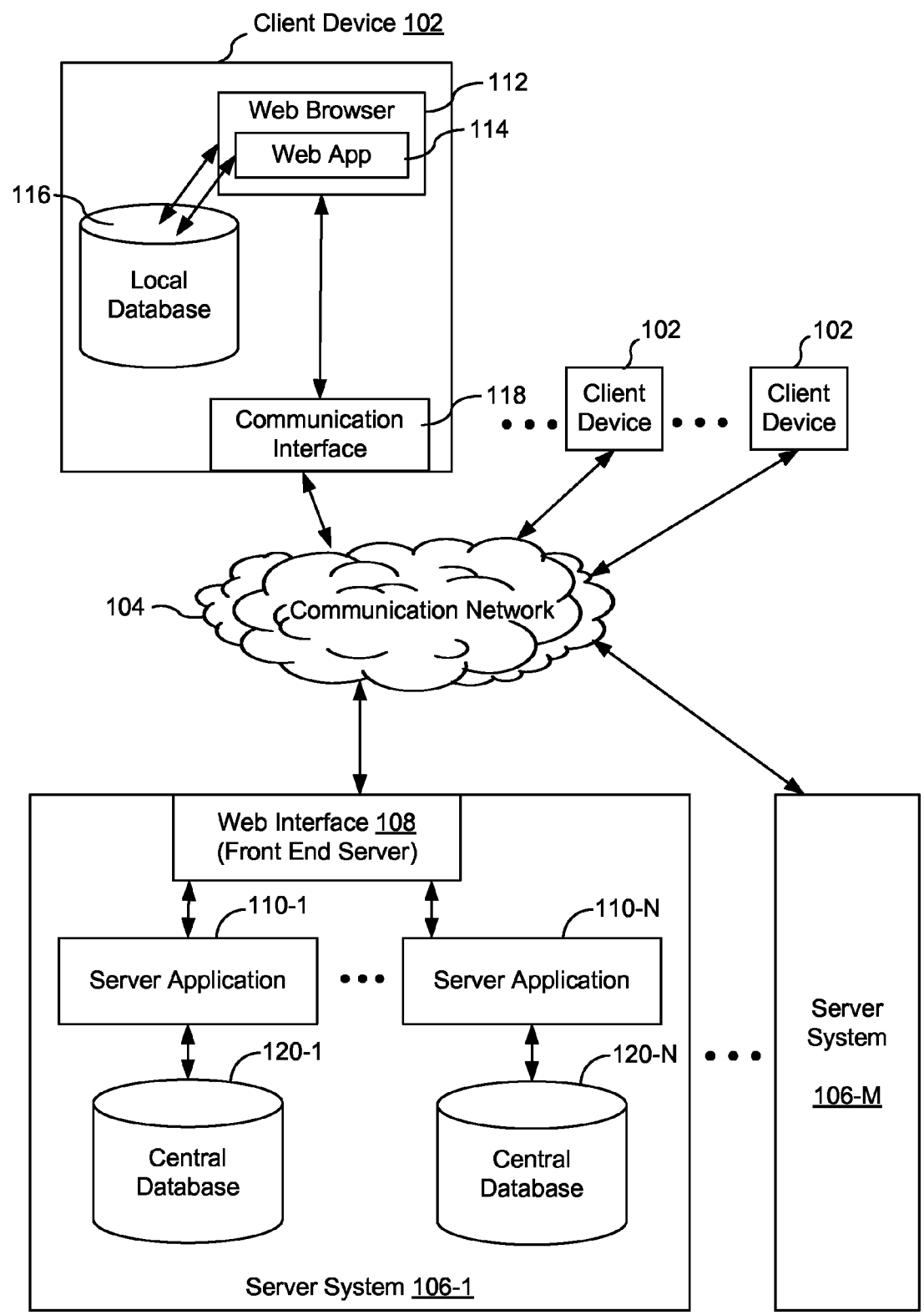
FIG. 1 is a block diagram illustrating the infrastructure of a client-server distributed system in accordance with some embodiments.

FIG. 1 is a block diagram illustrating the infrastructure of a client-server distributed system according to some embodiments. The distributed system includes a plurality of client devices 102 and a plurality of server systems 106. These components are linked together through one or more communication networks 104 (e.g., the Internet, other wide area networks, local area networks, etc.) so that the various components can communicate with each other. In some embodiments, each of the server systems 106 is a single server. In other embodiments a server system 106 includes a plurality of servers such as a web interface (front end server) 108, one or more server applications 110 (which may be implemented on one or more servers) and one or more central databases 120 which are connected to each other through a local area network (LAN) and exchange information with the client devices 102 through a common interface (e.g., one or more server systems, also called front end servers). In embodiments having a plurality of server systems 106, the server systems 106 may be connected to each other through a local area network (LAN) or other communication network.

A client device 102 includes a client application such as a web browser 112. A user can use the web browser 112 to access one or more web applications 114 from the server systems 106. The web browser 112 and the web application 114 within the web browser 112 have access to data items stored in a local database 116 on the client 102. In some embodiments, accessing a web application 114 includes downloading a program from a server system 106 and storing data in a local database 116 for use by the web application 114. The client device 102 (sometimes called the "client device" or "client computer") may be any computer or similar device that is capable of receiving data from and sending requests (e.g., web application data requests, search queries, information requests, login requests, etc.) to the server system 106. Examples of client devices include, without limitation, desktop computers, notebook computers, tablet computers, mobile devices such as mobile phones and personal digital assistants, and set-top boxes. In the present application, the term "web application" means virtually any interactive application that provides the user with access to content received from a server system 106. Requests from a client device 102 are conveyed to a respective server system 106 using the HTTP protocol, using http requests through a communication interface 118 or other similar network communication protocols.

A server system 106 includes at least a web interface (front end server) 108, a server application 110 and a central database 120. The web interface 108 parses requests from the client devices 102, fetches corresponding web applications provided by the server application 110 and returns the web applications to the requesting client device(s) 102. Depending upon their respective locations in the topology of the client-server system, the web interface is implemented on a separate ("front end server") 108 and the server application is implemented on a separate ("back end server") 110. In the present application, the terms "web interface" and "front end server" are used interchangeably. In some other embodiments, the front end server 108 and the back end server 110 are merged into one software application or one server system 106.

In some embodiments, the server systems 106 are deployed over multiple computers (represented by N application servers and N central databases in FIG. 1) so as to provide different types of services, such as email services, search engine services, map services, social networking services and the like. In some other embodiments, one individual type of service may also be distributed among multiple servers. For example, consider a system in which a server application 110-1 is a web-based email service (e.g., the Gmail email application). Data items such as: email messages, conversations (e.g., lists of email messages), thread lists (e.g., lists of conversations) and account information (e.g., user profiles, user preferences, and account history) may be stored in one or more central database(s) 120 that are accessible to the server application 110. Server applications 110 may be connected to one or more central databases 120. In some embodiments a single server application 110 may have access to a single central database 120 (such as where information stored in the central database is needed only by the single server applications), while in other embodiments multiple server applications 110 have access to a single central database 120 (such as where a small amount of information is used by a number of server applications 110 and the information is updated frequently), in other embodiments multiple server applications 110 may be connected to multiple central databases 120 (such as where a large amount of data is stored and needed by a large number of server applications 110).

Figure 2:
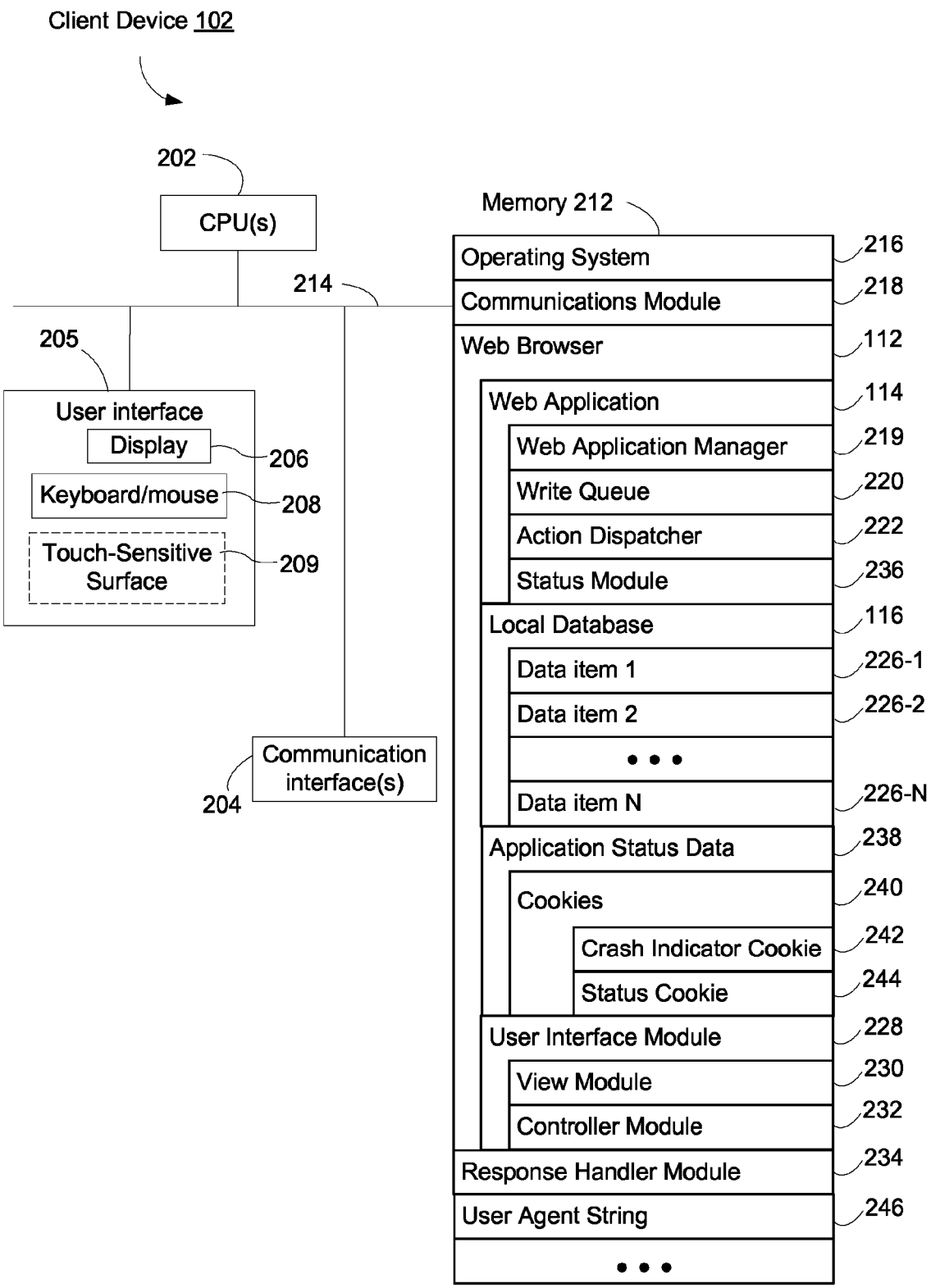
FIG. 2 is a block diagram illustrating components of an exemplary client device in accordance with some embodiments.

Attention is now directed to FIG. 2, which is a block diagram illustrating a computer system (e.g., client device 102) in accordance with one embodiment of the present invention. The client device 102 typically includes one or more processing units (CPUs) 202, one or more network or other communications interfaces 204, memory 212, and one or more communication buses 214 for interconnecting these components. The client device 102 optionally may include a user interface 205 comprising a display device 206 and a keyboard/mouse 208 (or, in some embodiments a touch-sensitive surface 209). Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, comprises a computer readable storage medium. In some embodiments, memory 212 or the computer readable storage medium of memory 212 stores the following programs, modules and data structures, or a subset thereof:

- an operating system 216 that includes procedures for handling various basic system services and for performing hardware dependent tasks;
- a communications module 218 that is used for connecting the client device 102 to other computers via the one or more communication interfaces 204 (wired or wireless) and one or more communication networks, such as the Internet, other wide area networks, local area networks, metropolitan area networks, and so on;
- a client application (or instructions), such as a web browser 112, for receiving a user request for a web application 114, rendering the requested web application 114 on the display device 206 or other user interface device using a user interface module 228, and storing data items in a local database 116; in some embodiments, the web application 114, local database 116 and the user interface module execute within the web browser. Applications and or data associated with the web browser 112 include:
  - the one or more web applications 114, which may include a web application manager 219 for coordinating operations within the web application 114, a write queue 220 for queuing operations from the web application manager 219, an action dispatcher 222 for writing to a local database 116 and a status module 236 that tracks the status of the web application;

the local database 116, which stores data items (e.g., 226-1. 226-2) received at the web application 114 from various servers systems 106;

application status data 238 managed by the status module 236, which data 238 may include cookies 240, such as a crash indicator cookie 242 or a crash status cookie 244; This status data 238 is stored in persistent local memory so that it is available even after a browser or application crash or other abnormal termination event.

the user interface module 228, which includes a view module 230 for rendering the user interface and a controller module 232 for detecting user interaction events and passing along user interaction events to other modules; and a response handler module 234 for responding to communications from the server system by storing data items in the local database 116 and communicating information to the web application 114.

a user agent string 246, which includes information about the client device and may be expressed as a character string Although FIG. 2 shows a "client device 102" the client device described with reference to FIG. 2 is intended more as functional description of the various features which may be present in a client device 102 than as a structural schematic of the embodiments described herein. In practice, and as recognized by those of ordinary skill in the art, items shown separately could be combined and some items could be separated. For example, the client application (e.g., the web browser 112) may be integrated with the operating system 216 in some embodiments. In some embodiments, various functions of the client application (e.g., web browser 112) may be performed by two or more separate applications. In some embodiments, the local database 116, shown as part of the web browser 112, could be a local database accessible to a plurality of client applications on the client device.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 212 may store a subset of the modules and data structures identified above. Furthermore, memory 212 may store additional modules and data structures not described above.

Figure 3:
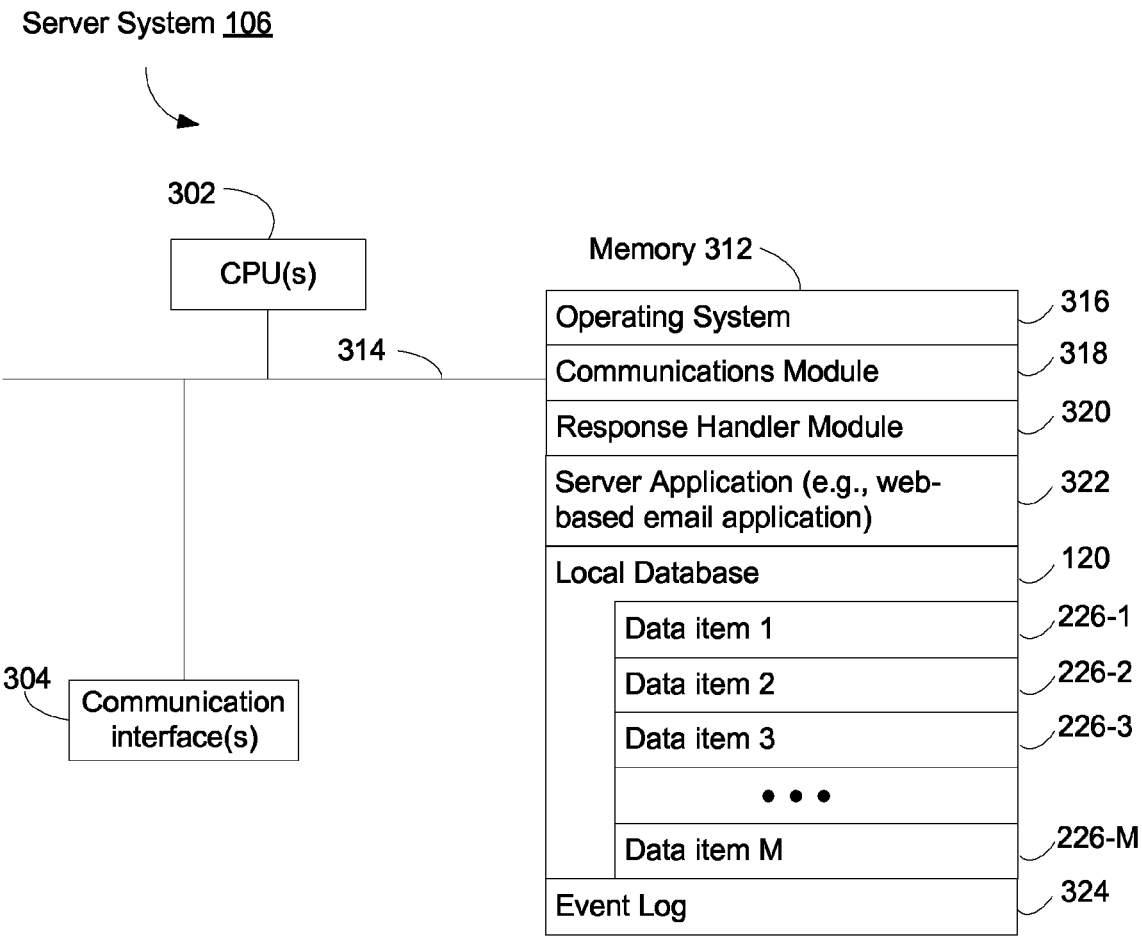
FIG. 3 is a block diagram illustrating components of an exemplary server system in accordance with some embodiments.
Figure 5:
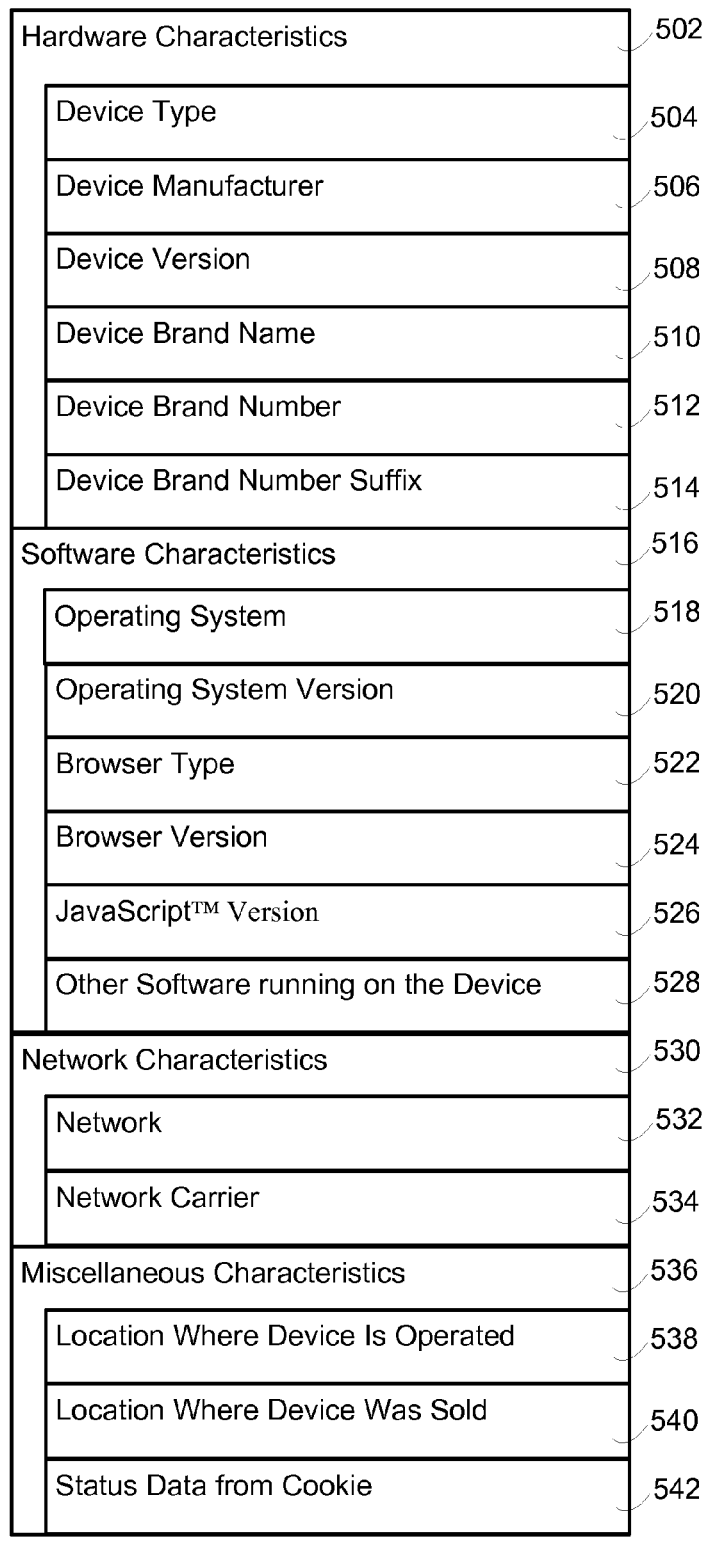
FIG. 5 illustrates an exemplary data structure for an event log in accordance with some embodiments.

Attention is now directed to FIG. 3, which is a block diagram illustrating a server system 106 in accordance with one embodiment of the present invention. The server system 106 typically includes one or more processing units (CPUs) 302, one or more network or other communications interfaces 304, memory 312, and one or more communication buses 314 for interconnecting these components. Memory 312 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 312 may optionally include one or more storage devices remotely located from the CPU(s) 302. Memory 312, or alternately the non-volatile memory device(s) within memory 312, comprises a computer readable storage medium. In some embodiments, memory 312 or the computer readable storage medium of memory 312 stores the following programs, modules and data structures, or a subset thereof:

an operating system 316 that includes procedures for handling various basic system services and for performing hardware dependent tasks;

a communication module 318 that is used for connecting the server system 106 to other computers via the one or more communication interfaces 304 (wired or wireless) and one or more communication networks, such as the Internet, other wide area networks, local area networks, metropolitan area networks, and so on;

a response handler module 320 that passes communications between the server system 106 and client devices 102, the response handler module can be used in conjunction with or instead of a separate front end server (108 in FIG. 1);

a server application 110 that prepares responses to requests that are received from the client device 102, in some embodiments the server application 110 sends the web application 114 to the client device 102;

a central database 120 for storing data items (e.g., 226-1, 226-2) associated with the server application 110 and/or the web application 114;

an event log 324 comprising a data structure, such as the structure 500 in FIG. 5, for storing information received from client devices 102 regarding abnormal events, the event log 324 storing characteristics of the client devices 102 where the abnormal events occurred; the event log information is used by the server to identify conditions of client devices 102 that are correlated with the occurrence of abnormal termination events for particular web applications.

Although FIG. 3 shows a single server system 106, the server described in with reference to FIG. 3 is intended more as functional description of the various features which may be present in a server system than as a structural schematic of the embodiments described herein. In practice, and as recognized by those of ordinary skill in the art, items shown separately could be combined and some items could be separated. For example, some items shown separately in FIG. 3 could be implemented on single server, and single items could be implemented by one or more servers. The actual number and types of servers used to implement an server system 106 (FIG. 1) and how features are allocated among them will vary from one implementation to another, and may depend in part on the amount of data traffic that the system must handle during peak usage periods as well as during average usage periods.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 312 may store a subset of the modules and data structures identified above. Furthermore, memory 312 may store additional modules and data structures not described above.

Figure 4A:
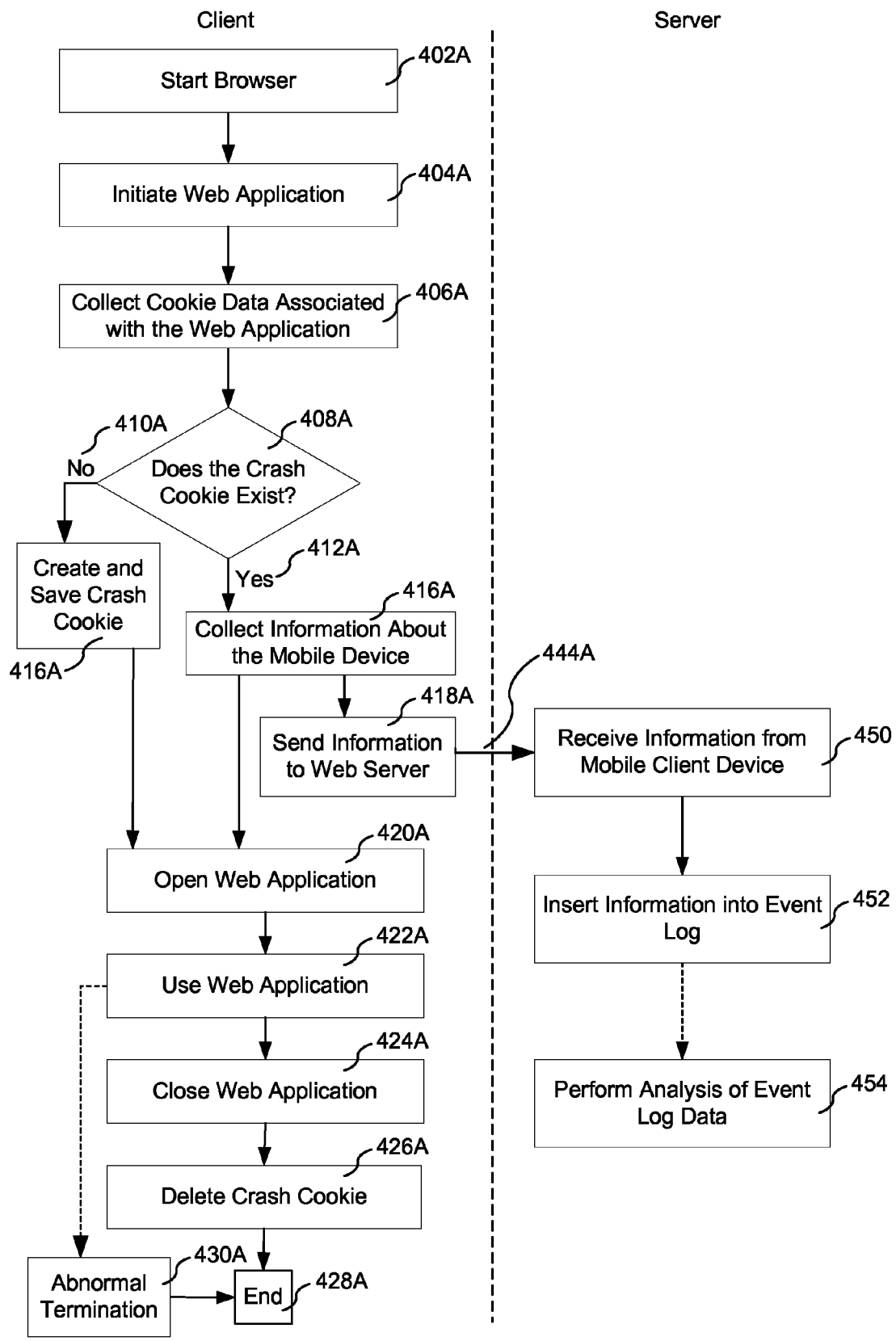
FIGS. 4A and 4B are flow diagrams illustrating methods of tracking abnormal web application events in accordance with some embodiments.
Figure 4B:
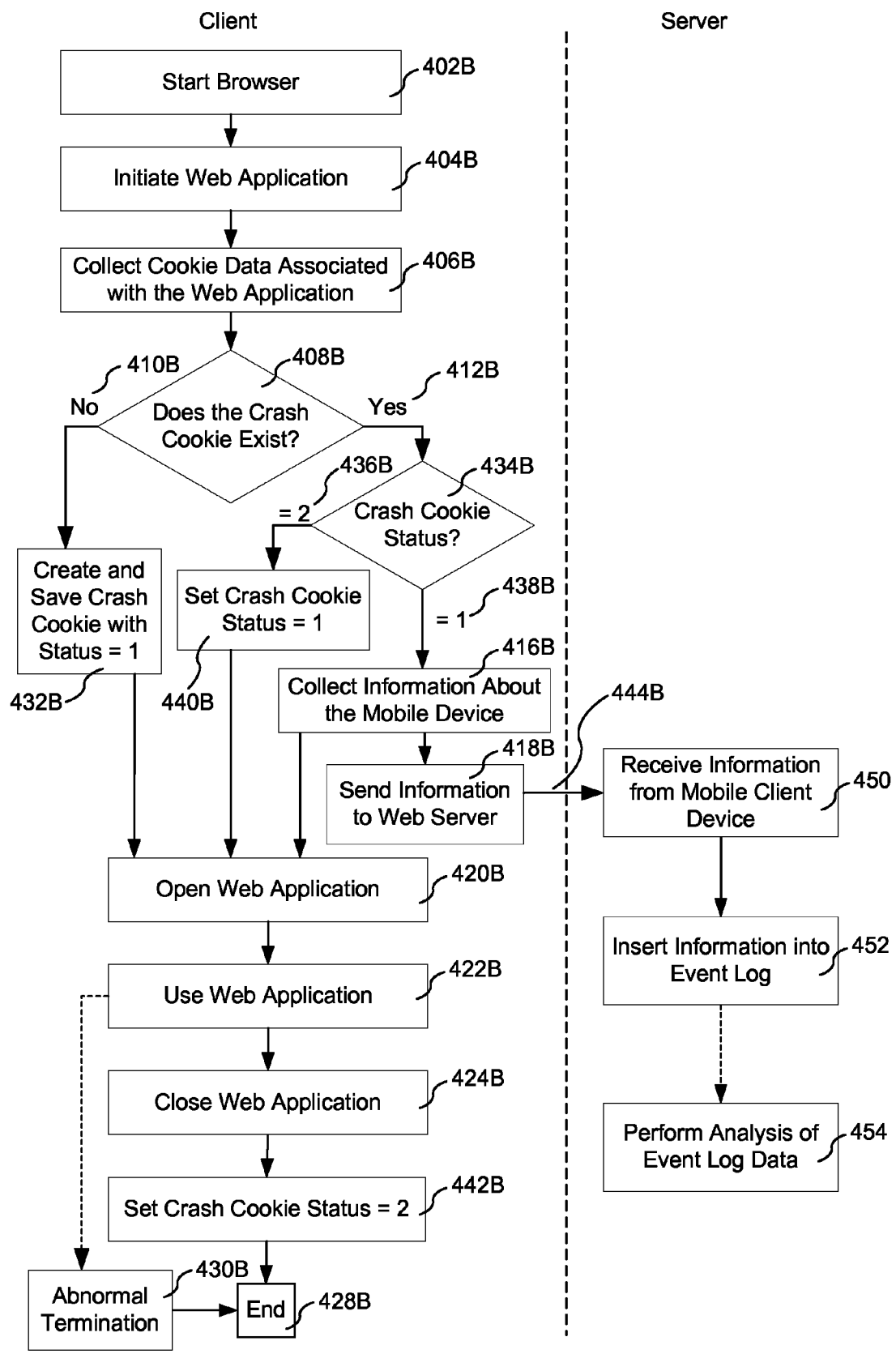

Attention is now directed towards FIGS. 4A and 4B that illustrate process flows according to some embodiments.

FIG. 4A illustrates the process flow of an exemplary method that tracks abnormal web application events using cookies, and sends information relevant to the abnormal events to a web server. Abnormal events include abnormal terminations (crashes) of the web browser or abnormal terminations (crashes) of the web application running in the web browser. The information sent to the web server may include the device type, the manufacturer of the device, the device version, the device brand name or number (including any suffix), the network used, the network carrier, the operating system (OS) running on the device, the operating system version, the browser type, the browser version, the location where the device is currently located, or other data identifying the hardware, the operating system, the browser, or other software running on the device. Much of this information is derived from the user agent string 246 stored on the client device and transmitted to the server following the occurrence of an abnormal event on the client device.

The left side of FIG. 4A identifies operations that occur at a mobile client device, and the right side of FIG. 4A identifies operations that occur at a web server.

A user starts (402A) a web browser on a mobile client device, and opens (404A) a web application, such as Gmail Mobile in the web browser. While starting up the web application, cookies relevant to the web application are retrieved (406A) from persistent memory on the device. One of the cookies that may exist is a crash indicator. More generally, there could be an abnormal event indicator cookie. During startup of the web application a determination is made (408A) whether the crash cookie exists. If the crash cookie does not exist (410A), the cookie is created (416A) and saved (416A) to persistent memory on the device. Alternatively, if the crash cookie does exist (412A), the web application may have failed to close properly on a previous occasion. In this case, information about the mobile device is collected (416A) and sent (418A) to a web server in a "bad event" message 444A. In this context, "information about the mobile device" contained in the bad event message may include information about the physical hardware of the device, the operating system running on the device, the browser running on the device, other software running on the device, or any other characteristics of the device that may affect the running of web applications (such as which version of the JAVASCRIPT scripting language is being used). The information may also include flags or other data written to the crash cookie. Exemplary characteristics are described above. In some embodiments the information about the mobile device may be contained in the user agent string 246. In some embodiments the information sent to the web server also includes a count of the number of abnormal events that have occurred since the last time the web application sent a "bad event" message to the web server.

Whether or not the crash cookie existed prior to startup of the web application, the crash cookie will exist when the web application opens (420A). Once the web application is open, a user can interact (422A) with the application. For example, when a user opens Gmail Mobile, a user may read or compose electronic mail messages. In some embodiments the web application writes information to the crash cookie while the web application is being used. In some embodiments the information written to the crash cookie identifies a current operation performed by the web application. For example, if the web application is Gmail Mobile, the application may write information to the crash cookie when a user opens an email attachment. The information saved in the crash cookie would indicate that the user was opening an email attachment. If Gmail Mobile subsequently crashes, the information in the crash cookie would identify the operation that occurred before the crash, providing more diagnostic information. In some embodiments the information written to the crash cookie may characterize or identify a service that was provided by the web browser.

Normally a user will close (424A) the web application at some point. When this occurs, the crash cookie is deleted (426A) and process is complete (428A). However, sometimes the application terminates abnormally (430A). When this occurs, the crash cookie is not deleted, so the continued presence of the crash cookie is indicative of an abnormal termination. Note, in particular, that a crash cookie exists in persistent memory, so it is not affected by browser crashes. A crash cookie is not a "session cookie" that exists only during the browser session.

When a mobile device sends (418A) "bad event" information (444A) to a web server, the web server receives (450) the information from a mobile device and inserts (452) the information into an event log. The information includes multiple characteristics of the mobile device. The information includes device type and browser type, and may include other characteristics as described above. In some embodiments the characteristics include data about the hardware running on the mobile device. In some embodiments the characteristics include data about software running on the mobile device, such as the browser. In some embodiments the characteristics include data about the operating system running on the mobile device. In some embodiments, much of this information is derived from the user agent string 246 stored on the client device, which identifies device characteristics in a standard format.

An event log may be one or more tables in a database, or one or more files on a file server, or any other means of storing electronic data. For example, an exemplary event log could be a table in a SQL database. The web server generally receives (450) bad event information from multiple mobile devices, and stores (452) the information in an event log, such as the exemplary event log 500 shown in FIG. 5. At some point in time the web server (or other server application) analyzes (454) the data in the event log. The analysis may occur immediately after receiving data from a mobile device, at scheduled points in time (such as once a day), or as requested on an ad hoc basis by a person who has access to the event log. The analysis may determine a pattern of abnormal events, and may associate the pattern of abnormal events with specific characteristics of certain mobile devices. For example, if a new browser with only 1% market share is associated with 10% of the web application crashes, the excess of crashes for this browser creates a pattern that can be associated with this browser.

FIG. 4B illustrates the process flow of an alternative exemplary method that tracks abnormal web application events using cookies, and sends information relevant to the abnormal events to a web server. Abnormal events include abnormal terminations (crashes) of the web browser or abnormal terminations (crashes) of the web application running in the web browser. FIG. 5 illustrates exemplary information about a mobile device that may be sent to the web server, or derived from other information sent to the web server. In some embodiments the information may be categorized as illustrated in FIG. 5. In the embodiment of FIG. 5, the information falls into four categories: hardware characteristics (502), software characteristics (516), network characteristics (530), and miscellaneous characteristics (536). The category of hardware characteristics (502) comprises device type (504), device manufacturer (506), device version (508), device brand name (510), device brand number (512), and device brand number suffix (514). In the embodiment of FIG. 5 the software characteristics (516) comprise operating system (518), operating system version (520), browser type (522), browser version (524), JAVASCRIPT scripting language version (526), and other software running on the device (528). In the embodiment of FIG. 5 the network characteristics (530) comprise network (532) and network carrier (534). In the embodiment of FIG. 5, the miscellaneous characteristics (536) comprise location where the device is operated (538), location where the device was sold (540), and status data from an application cookie (542). In some embodiments the location where the device was sold (540) may be derived from other device characteristics, such as hardware or software version numbers. A person of skill in the art would recognize that the information sent to the web server need not include all of the characteristics illustrated in FIG. 5, and would also recognize that other data could be included in the information, such as other data that identifies the hardware, the operating system, the browser, or other software running on the device. Some of the characteristics included in the event log may be derived or calculated from other characteristics, and thus may not be part of the information transmitted from the mobile device to the web server.

The left side of FIG. 4B identifies operations that occur at a mobile client device, and the right side of FIG. 4B identifies operations that occur at a web server.

A user starts (402B) a web browser on a mobile client device, and opens (404B) a web application, such as Gmail Mobile in the web browser. While starting up the web application, cookies relevant to the web application are retrieved (406B) from persistent memory on the device. One of the cookies that may exist is a crash indicator. More generally, there could be one or more abnormal event indicator cookies. During startup of the web application a determination is made (408B) whether the crash cookie exists. If the crash cookie does not exist (410B), the cookie is created (432B) and saved (432B) to persistent memory on the device. The crash cookie includes a status indicator that indicates whether the web application closed normally the last time it was used. In some embodiments a status value of 1 indicates that the web application has been opened and not yet closed. When the crash cookie is created (432B) and saved (432B) initially, the status value is set to 1. The status will later change (442B) to 2 after the web application closes normally.

If the crash cookie does exist (412B) when the web application begins, the status is checked (434B) to assess whether the web application terminated normally the last time the web application was used. If the status is 2 (436B), the web application terminated normally last time, so there is no abnormal event to report. The status is changed (440B) to 1 to indicate that the web application has been opened. If the status is 1 (438B), then the web application may have failed to close properly on a previous occasion. In this case, information about the mobile device is collected (416B) and sent (418B) to a web server in a message (444B) indicating the occurrence of an abnormal event. In this context, "information about the mobile device" may include information about the physical hardware of the device, the operating system running on the device, the browser running on the device, other software running on the device, or any other characteristics of the device that may affect the running of web applications (such as JAVASCRIPT scripting language version). The information may also include flags or other data written to the crash cookie. Exemplary characteristics are described above in reference to FIG. 5. In some embodiments the message (444B) includes a user agent string 246 that includes some or all of the device characteristics that will be stored in the event log. In some embodiments the information sent to the web server also includes a count of the number of abnormal events that have occurred since the last time the web application sent an abnormal event message to the web server.

Regardless of whether the crash cookie existed prior to startup of the web application, and regardless of the status value in the crash cookie, the crash cookie will exist and have status=1 when the web application opens (420B). Once the web application is open, a user can interact (422B) with the application. For example, when a user opens Gmail Mobile, a user may read or compose electronic mail messages. In some embodiments the web application writes information to the crash cookie while the web application is being used. In some embodiments the information written to the crash cookie identifies a current operation performed by the web application. For example, if the web application is Gmail Mobile, the application may write information to the crash cookie when a user opens an email attachment. The information saved in the crash cookie would indicate that the user was opening an email attachment. If Gmail Mobile subsequently crashes, the information in the crash cookie may identify the operation that occurred before the crash, providing more diagnostic information. In some embodiments the information written to the crash cookie may characterize or identify a service that was provided by the web browser.

Normally a user will close (424B) the web application at some point. When this occurs, the status of the crash cookie is set (442B) to 2 and process is complete (428B). However, sometimes the application terminates abnormally (430B). When this occurs, the status of the crash cookie remains set to 1. Because the crash cookie exists in persistent memory, it is not affected by browser crashes. A crash cookie is not a "session cookie" that exists only during the browser session.

When a mobile device sends (418B) information to a web server, the web server receives (450) the information from a mobile device and inserts (452) the information into an event log. An exemplary event log 500 is illustrated in FIG. 5. The information includes multiple characteristics of the mobile device. The specific information in an event log may depend on what information is available from client devices. The previous description provides particular values of status bits associated with the crash cookie, status message, and stored status information that convey and represent status information for a particular web application. These status values are representative; other values, numeric or other, can be employed in other embodiments to represent this status information, either individually or in combination.

An event log may be one or more tables in a database, or one or more files on a file server, or any other means of storing electronic data. For example, an exemplary event log may be implemented as a table in a SQL database. The web server generally receives (450) information from multiple mobile devices and inserts (452) the information into an event log. At some point in time the web server (or other server application) analyzes (454) the data in the event log. The analysis may occur immediately after receiving data from a mobile device, at scheduled points in time (such as once a day), or as requested on an ad hoc basis by a person who has access to the event log. The analysis may determine a pattern of abnormal events, and may associate the pattern of abnormal events with specific characteristics of certain mobile devices. For example, the analysis may identify an excess number of web application crashes when the web application is running in a specific browser on a particular device and operating system combination.

In some embodiments, additional status values are used to identify with greater specificity what the web application is doing rather than the simple "open" or "closed" statuses used in the embodiment of FIG. 4B. For example, a status value of 1 could indicate initial startup, 2 could indicate that the JAVASCRIPT scripting language engine has started, 3 could indicate the database engine has opened, and so on. Different status values could also identify the user's current view in the web application. In these embodiments there would be one "closed" value that indicates proper termination of the web application. At startup, if the status value of the crash cookie is anything other than the "closed" value, an abnormal event message would be sent to the web server, and the status value would be included in the abnormal event message. A person of skill in the art would recognize that status values could be encoded in many different forms, using numeric values, fixed length character strings, variable length character strings, a sequence of bits, or other formats.

A person of skill in the art would recognize that the disclosed embodiments for identifying abnormal events can be both over inclusive and under inclusive. That is, not all abnormal events will result in sending an abnormal event message to the web server, and some abnormal event messages will be sent without a true abnormal event. For example, consider the embodiment illustrated in FIG. 4A. If a user opens one instance of the web application in a browser, then opens a second instance of the web application in another browser window without closing the first instance, a false abnormal event may be sent to the web server. The first instance of the web application creates the crash cookie, and it still exists when the second instance opens, so the method embodied in FIG. 4A would report this as an abnormal event when the second instance opens. However, if the user opens the second instance with a bookmark from the browser, the browser will generally close the prior instance of the web application (thus deleting the cookie), so that when the second instance opens, the crash cookie does not exist. In this scenario, no abnormal event message would be transmitted to the web server.

In some cases there will be real crashes that are unreported. For example, the web application may crash, leaving the crash cookie saved. If the user then "deletes cookies" from the browser, the crash cookie will not exist the next time the web application starts, so no abnormal event message will be sent to the web server. In this case there was a crash, but the crash will not be reported to the web server. Other unexpected or unusual patterns of user activity, alone or in combination with unexpected or unusual behavior of the hardware or software, may result in underreporting or over reporting of abnormal events.

Each of the methods described herein may be governed by instructions that are stored in a computer readable storage medium and that are executed by one or more processors of one or more server systems 106 or client devices 102. Each of the operations shown in 4A and 4B may correspond to instructions stored in a computer memory or computer readable storage medium.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for tracking activity on mobile devices, performed at a mobile client device with a persistent memory and a web browser configured to execute at the mobile client device, comprising:
  defining a crash indicator cookie that corresponds to a client web application that executes within the web browser at the mobile client device;
  initiating the client web application, including:
    determining whether the crash indicator cookie for the client web application is present in the persistent memory;
    when the crash indicator cookie is not present in the persistent memory:
      storing the crash indicator cookie in the persistent memory;
    when the crash indicator cookie is present in the persistent memory:
      determining information about the mobile client device and the web browser, and
      sending, to a remote web server, a message that includes the information and an indication of an occurrence of an abnormal event; and
  deleting the crash indicator cookie from the persistent memory when the client web application terminates normally.

2. The computer-implemented method of claim 1, wherein the message includes a count indicating a number of abnormal events that have occurred since a prior communication to the remote web server.

3. The computer-implemented method of claim 1, further comprising:
  during execution of the client web application, writing information to the crash indicator cookie, wherein the information identifies an operation performed by the client web application.

4. The computer-implemented method of claim 1, further comprising:
  during execution of the client web application, writing information to the crash indicator cookie, wherein the information identifies a service provided by the web browser.

5. A computer-implemented method for tracking activity on mobile devices, performed at a mobile client device with a persistent memory and a web browser configured to execute at the mobile client device, comprising:
  defining a crash indicator cookie that corresponds to a client web application that executes within the web browser at the mobile client device, wherein the crash indicator cookie includes a status indicator;
  initiating the client web application, including:
    determining whether the crash indicator cookie for the client web application is present in the persistent memory;
    when the crash indicator cookie is not present in the persistent memory:
      storing the crash indicator cookie in the persistent memory with the status indicator set to a first status value;
    when the crash indicator cookie is present in the persistent memory and the status indicator of the crash indicator cookie is set to the first status value:
      determining information about the mobile client device and the web browser, and
      sending, to a remote web server, a message that includes the determined information and an indication of an occurrence of an abnormal event;
    when the crash indicator cookie is present in the persistent memory and the status indicator of the crash indicator cookie is set to a second status value:
      updating the value of the status indicator in the crash indicator cookie to the first status value; and updating the value of the status indicator in the crash indicator cookie to the second status value when the client web application terminates normally, wherein the second status value is distinct from the first status value.

6. The computer-implemented method of claim 5, wherein the message includes a count indicating a number of abnormal events that have occurred since a prior communication to the remote web server.

7. The computer-implemented method of claim 5, further comprising:
during execution of the client web application, writing information to the crash indicator cookie, wherein the information identifies an operation performed by the client web application.

8. The computer-implemented method of claim 5, further comprising:
during execution of the client web application, writing information to the crash indicator cookie, wherein the information identifies a service provided by the web browser.

9. A computer-implemented method for identifying a pattern of abnormal web browser events on mobile devices, performed at a server, comprising:
receiving information from a plurality of mobile client devices relating to abnormal events for a web application executing on the mobile client devices, wherein the information includes a plurality of device characteristics of each mobile client device, including device type and web browser type;
storing the information in an event log;
identifying a pattern of abnormal events based on the information in the event log; and
associating the pattern of abnormal events with one or more device characteristics stored in the event log.

10. The computer-implemented method of claim 9 wherein the device characteristics comprise data about hardware components of each mobile client device.

11. The computer-implemented method of claim 9 wherein the device characteristics comprise data about software running on each mobile client device.

12. The computer-implemented method of claim 9 wherein the device characteristics comprise data about the web browser running on each mobile client device.

13. A mobile client device, comprising:
a display;
one or more processors;
memory, including both volatile memory and persistent memory; and
a web browser program and a client web application program that executes within the web browser, wherein the web browser program and the client web application program are stored in the memory and configured to be executed by the one or more processors, the web browser program and the client web application program including instructions for:
defining a crash indicator cookie that corresponds to the client web application;
initiating the client web application program within the web browser program at the mobile client device, including:
determining whether the crash indicator cookie for the client web application program is present in the persistent memory;
when the crash indicator cookie is not present in the persistent memory:
storing the crash indicator cookie in the persistent memory;
when the crash indicator cookie is present in the persistent memory:
determining information about the mobile client device and the web browser program, and
sending, to a remote web server, a message that includes the determined information and an indication of an occurrence of an abnormal event; and
deleting the crash indicator cookie from the persistent memory when the client web application program terminates normally.

14. The mobile client device of claim 13, wherein the message includes a count indicating a number of abnormal events that have occurred since a prior communication to the remote web server.

15. The mobile client device of claim 13, further comprising:
instructions for writing information to the crash indicator cookie during execution of the client web application program, wherein the information identifies an operation performed by the client web application program.

16. The mobile client device of claim 13, further comprising:
instructions for writing information to the crash indicator cookie during execution of the client web application, wherein the information identifies a service provided by the web browser program.

17. The computer-implemented method of claim 1, wherein the client web application is an email application.

18. The computer-implemented method of claim 5, wherein the client web application is an email application.

* * * * *